(12) United States Patent
Voloshynovskiy

(10) Patent No.: US 9,794,067 B2
(45) Date of Patent: Oct. 17, 2017

(54) METHOD FOR ACTIVE CONTENT FINGERPRINTING

(71) Applicant: Université de Genève, Genève (CH)

(72) Inventor: Svyatoslav Voloshynovskiy, Vésenaz (CH)

(73) Assignee: Université de Genève, Genéve (CH)

( * ) Notice: Subject to any disclaimer, the term of this patent is extended or adjusted under 35 U.S.C. 154(b) by 0 days.

(21) Appl. No.: 14/433,618

(22) PCT Filed: Sep. 18, 2013

(86) PCT No.: PCT/EP2013/069414
§ 371 (c)(1),
(2) Date: Apr. 3, 2015

(87) PCT Pub. No.: WO2014/056691
PCT Pub. Date: Apr. 17, 2014

(65) Prior Publication Data
US 2015/0256339 A1    Sep. 10, 2015

(30) Foreign Application Priority Data

Oct. 8, 2012 (EP) ..................... 12187627

(51) Int. Cl.
*H04L 9/08* (2006.01)
*H04L 9/00* (2006.01)
(Continued)

(52) U.S. Cl.
CPC ............ *H04L 9/0866* (2013.01); *G06F 21/14* (2013.01); *G06T 1/005* (2013.01); *H04L 9/00* (2013.01);
(Continued)

(58) Field of Classification Search
CPC .. H04L 9/0866; H04L 9/0819; H04L 2209/24
(Continued)

(56) References Cited

U.S. PATENT DOCUMENTS

| 2004/0028281 A1* | 2/2004 | Cheng ..................... G06F 21/10 382/232 |
| 2013/0246077 A1* | 9/2013 | Riedmiller ............ G10L 19/008 704/500 |
| 2015/0193451 A1* | 7/2015 | Rowe ..................... H04N 5/445 348/571 |

OTHER PUBLICATIONS

Cox, Ingemar J., et al., "Digital Watermarking," Morgan Kaufmann Publishers (Academic Press), 58 pgs., (2002).
(Continued)

*Primary Examiner* — Matthew Henning
(74) *Attorney, Agent, or Firm* — Christensen, Fonder, Dardi & Herbert PLLC

(57) ABSTRACT

A method of providing robust and secure fingerprints including, at an enrollment stage, the steps of providing a content x for which a fingerprint is to be provided, assigning an ID number to the content x, providing a secret key k, generating a fingerprint $b_x$ based on content x and secret key k, storing the generated fingerprint $b_x$ together with the assigned ID in a database, as well as, at an identification stage, the steps of extracting, for a given query content y which might result either from the enrolled content x or an unrelated content x', an estimate fingerprint $b_y$ based on content y, and secret key k, producing an estimated ID number based on the estimate fingerprint $b_y$ for identifying the content x using said ID number stored in the database, or else rejecting the query.

18 Claims, 4 Drawing Sheets

(51) Int. Cl.
G06F 21/14 (2013.01)
G06T 1/00 (2006.01)
H04N 21/8358 (2011.01)
H04N 21/266 (2011.01)

(52) U.S. Cl.
CPC .... H04L 9/0819 (2013.01); *G06T 2201/0052* (2013.01); *G06T 2201/0065* (2013.01); *H04L 2209/24* (2013.01); *H04N 21/26613* (2013.01); *H04N 21/8358* (2013.01)

(58) Field of Classification Search
USPC .......................................................... 380/44
See application file for complete search history.

(56) References Cited

OTHER PUBLICATIONS

Gel'fand, S.I., et al., "Coding for Channel With Random Parameters," *Problems of Control and Information Theory*, vol. 9(1), pp. 19-31 (1980).

Pérez-Freire, Luis, et al., "Spread-Spectrum Watermarking Security," *IEEE Transactions on Information Forensics and Security*, vol. 4, No. 1, pp. 2-24 (Mar. 2009).

Chen, Brian, "Quantization Index Modulation: A Class of Provably Good Methods for Digital Watermarking and Information Embedding," *IEEE Transactions on Information Theory*, vol. 47, No. 4, pp. 1423-1443 (May 2001).

Pérez-González, Fernando, et al., "Performance Analysis of Existing and New Methods for Data Hiding With Known-Host Information in Additive Channels," *IEEE Transactions on Signal Processing*, vol. 51, No. 4, pp. 960-980 (Apr. 2003).

Koval, O., et al., "On security threats for robust perceptual hashing," *Proceedings of SPIE Photonics West, Electronic Imaging/Media Forensics and Security XI*, San Jose, USA, 13 pgs. (2009).

Varna, Avinash L., et al, "Modeling and Analysis of Correlated Binary Fingerprints for Content Identification," *IEEE Transactions on Information Forensics and Security*, vol. 6, No. 3, pp. 1146-1159 (Sep. 2011).

Fischer, Robert F.H., et al., "Lattice Costa Schemes using Subspace Projection for Digital Watermarking," *European Trans. Telecommunications*, vol. 15, pp. 351-362 (2004).

Voloshynovskiy, S., et al., "Information-Theoretical Analysis of Private Content Identification," *IEEE Information Theory Workshop, ITW 2010*, Dublin, Ireland, 5 pgs. (Aug. 30-Sep. 3, 2010).

Lowe, David G., "Distinctive Image Features from Scale-Invariant Keypoints," *International Journal of Computer Vision*, vol. 60, No. 2, pp. 91-110 (Nov. 2004).

Voloshynoviskiy, Sviatoslav, et al., "Active content fingerprinting: a marriage of digital watermarking and content fingerprinting," (*WIFS, 2012, IEEE International Workshop On*, IEEE, Dec. 2, 2012 (pp. 175-180).

Farhadzadeh, Farzad, et al., "Performance Analysis of Content-Based Identification Using Constrained List-Based Decoding," *IEEE Transactions on Information Forensics and Security*, vol. 7, No. 5, Oct. 212 (pp. 1652-1667).

Diephuis, M., et al., "DCT Signed Based Robust Privacy Preserving Image Copy Detection for Cloud-based Systems," *Content-Based Multimedia Indexing (CBMI), 2012 10th International Workshop on, IEEE*, Jun. 27, 2012 (pp. 1-6).

Farhadzadeh, Farzad, et al., "Information-Theoretic Analysis of Content Based Identification for Correlated Data," *IEEE Information Theory Workshop*, Oct. 16, 2011 (pp. 205-209).

Fischer, Robert F.H., et al., "Lattice Costa schemes using subspace projection for digital watermarking," *European Transactions on Telecommunications*, vol. 15, No. 4, Jul. 1, 2014 (pp. 351-361).

* cited by examiner

× SIFT feature

○ Centroid of lattice
×→● Move SIFT feature to lattice

METHOD FOR ACTIVE CONTENT FINGERPRINTING

PRIORITY CLAIM

The present application is a National Phase entry of PCT Application No. PCT/EP2013/069414, filed Sep. 18, 2013, which claims priority from European Patent Application Number 12187627.0, filed Oct. 8, 2012, the disclosures of which are hereby incorporated by reference herein in their entirety.

FIELD OF THE INVENTION

The present invention pertains to a method of providing robust and secure fingerprints comprising, at an enrollment stage, the steps of providing a content x for which a fingerprint is to be provided, assigning an ID number to said content x, providing a secret key k, generating a fingerprint $b_x$ based on content x and secret key k, storing the generated fingerprint $b_x$ together with the assigned ID in a database, as well as, at an identification stage, the steps of extracting, for a given query content y which might result either from the enrolled content x or an unrelated content x', an estimate fingerprint $b_y$ based on content y, and secret key k, producing an estimated ID number based on said estimate fingerprint $b_y$, for identifying the content x using said ID number stored in the database, or else rejecting the query. The invention also concerns corresponding computer program means as well as use of the method in the domain of protection, authentication, and/or identification of digital or physical objects.

BACKGROUND OF THE INVENTION

In general, the present invention is directed to the protection of digital media, of printed documents, and of physical objects by means of modification of content or object features, such modification being supposed to enable the production of robust and secure fingerprints. The obtained fingerprints are, amongst many possible applications, mainly used for the content and/or object authentication, identification, or detection of local modification.

To present, there exist in general two methods allowing to realize such kind of protection which, however, use fundamentally different approaches, namely on the one side conventional content fingerprinting, also known as robust hashing, and on the other side digital watermarking, also referred to as data hiding.

Conventional content fingerprinting or robust hashing are techniques which extract a fingerprint directly from the object features and no preliminary content pre-processing is performed. As a result, the fingerprints are not very robust. Such lack of robustness leads to a large amount of errors or mismatches between the original fingerprint and the fingerprint extracted from a distorted counterpart of the original object. In turn, this results in most applications in the necessity to perform a highly complex search and identification for trying to match the original fingerprint and the extracted fingerprint. In authentication applications, this leads to higher privacy leaks due to the necessity to store large amounts of helper data which is somewhat proportional to the level of mismatch. Therefore, reducing the level of mismatch is of great importance in conventional content fingerprinting.

Digital watermarking or data hiding realize content modification by embedding a special mark or encoded message which carries information on the protected content. The content should be modified in such a way to ensure reliable and secure extraction of an embedded, desired message. This has two important consequences concerning the security as well as the cancellation of interference between content and embedded message. With respect to security, the need to embed the encoded message requires the use of special error correction codes that introduce redundancy which, in turn, can be efficiently used by attackers to attack the content by message removal key learning, thus reducing the level of security. With respect to cancellation of interference between the content and the embedded message, the content modification should, of course, be performed in such a way that the content features do not interfere with the embedded message, which in turn requires special techniques of modulation that by design are not secure and not robust with respect to several groups of distortions used by attackers trying to decode or remove the watermark. Therefore, whilst not requiring a highly complex search and identification at the time of extraction, watermarking bears inherent disadvantages due to the type of content modification performed.

In short, the above mentioned existing procedures inherently comprise several problems with respect to performance or security, since these approaches either require performing complex search and identification or introducing redundancy, respectively insecure modulation techniques.

SUMMARY OF THE INVENTION

The solutions according to prior art therefore do not entirely satisfy nowadays needs with respect to the protection of digital media, of printed documents, and of physical objects, such that there is still a need for a method of providing robust and secure fingerprints which, in particular, shall allow to achieve a very low error rate between the fingerprint extracted from the original and a distorted counterpart of the original object. At the same time, such a method should allow to realize a very high level of security of the fingerprints provided, whilst remaining technically not too complicated such as to maintain a high performance in terms of speed when applying the method on nowadays processors, respectively computers.

Thus, it is the object of the present invention to overcome the above mentioned difficulties and to realize a method of providing robust and secure fingerprints allowing to achieve the above mentioned objectives. It is another object of the present invention to realize corresponding computer program means adapted to implement the proposed method, as well as to use the method for the protection of digital—and/or physical objects.

To this effect, the present invention proposes a method of providing robust and secure fingerprints which is characterized by the features enumerated in claim 1 and which allows to achieve the objectives identified above. In particular, the method of providing robust and secure fingerprints according to the present invention distinguishes from prior art methods by the fact that, at the stage of generating the fingerprint $b_x$, it comprises the step of modulating the content x in the space of secret carriers of a transform domain defined by the key k such as to produce a modulated content vector v, said vector v replacing content x and being adapted to be used during the identification stage.

The modulation is chosen in a manner that it increases the magnitudes of at least the small coefficients of the vector components of the original content x in the space of secret carriers of said transform domain defined by the key k, such as to allow for reduction of the probability of bit error $P_b$ of the modulated content vector v.

More specifically, modulation of the content x in said transform domain is done according to a mapping of the general form $v=\Sigma_{i=1}^{N}\phi_i(\tilde{x}_i)w_i=\Sigma_{i\in K}\phi_i(\tilde{x}_i)w_i+\Sigma_{e\notin K}\tilde{x}_i w_i$ using a modulation function $\phi_i(\cdot)$ which is applied to the i-th coefficient belonging to the set of secret carriers. Said modulation function may, amongst several other possibilities, be chosen to be an additive modulation function of the form $\phi_A(\tilde{x}_i)=\tilde{x}_i+\alpha$ sign $(\tilde{x}_i)$ or a quantization-based modulation function of the form $\phi_Q(\tilde{x}_i)=c$ sign$(\tilde{x}_i)=\tilde{x}_i+c$ sign$(\tilde{x}_i)-\bar{x}_i=\bar{x}_i+(c-|\bar{x}_i|)$sign$(\tilde{x}_i)$. Other, more advanced modulation functions, e.g., allowing to modulate only the low-magnitude coefficients of the set K in the space of secret carriers are imaginable. This allows to design the modulation function according to specific requirements of a given application of the method and renders the latter quite flexible.

Also, modulation of the content x in said transform domain may be done by applying scalar or vector modulation, as well as together with lattice quantization and/or an auto error-correction scheme, both of these options allowing to further enhance the robustness of the fingerprint provided by the proposed method and to reduce the identification complexity based on bounded distance decoding.

Other features together with technical details, theoretical derivations and experimental data supporting the proposed methodology as well as the corresponding advantages of the present invention are mentioned in the dependent claims as well as in the description disclosing in the following, with reference to the figures, the invention in more detail.

BRIEF DESCRIPTION OF THE FIGURES

The attached figures exemplarily and schematically illustrate the principles as well as several embodiments of the present invention.

DETAILED DESCRIPTION

In the following, the invention shall be described in detail with reference to the above mentioned figures.

The present invention, in general, is situated in the context of techniques that are used for the content protection and distribution monitoring, such as conventional fingerprinting and digital watermarking methods. Nowadays, both of these techniques are well studied and their shortcomings are understood.

Content fingerprinting, also called robust perceptual hashing in some applications, has emerged as a tool for content identification and integrity verification, filtering of user-generated content websites, content tracking, broadcast monitoring, upload control, etc., like it is described, e.g., in the article "Modelling and analysis of correlated binary fingerprints for content identification" by A. Varna and M. Wu, IEEE Trans. on Information Forensics and Security, Vol. 6, pp. 1146-1159, 2011. Conventional content fingerprinting consists in the extraction of a short, robust and distinctive fingerprint, which is in most cases a binary vector, allowing the operation with data of lower dimensionality. The extracted fingerprints are stored in databases, which can also contain some additional information about the fingerprint relations, clustering or binning, enabling efficient search of similar fingerprints.

In conventional content fingerprinting, the fingerprint is computed directly from the original content of the object to be protected or monitored and does not require any content modifications such that this method preserves the original content quality. In this sense it can be considered as a passive content fingerprinting (pCFP), such as will become more clear in the following.

Figure 1A:
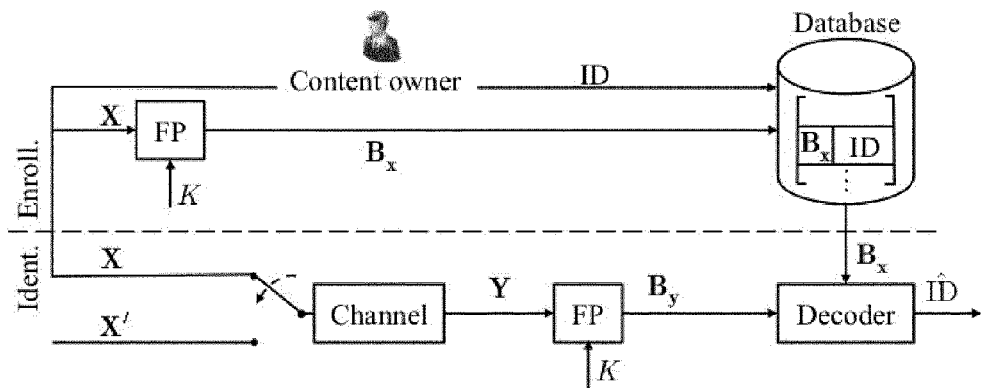
FIG. 1a schematically illustrates the principle steps of a conventional method of providing a fingerprint.

FIG. 1a schematically illustrates the principle steps of the conventional method of providing a fingerprint which shall be also called pCFP in the further course of the description. At the enrolment stage, the content owner provides the content $x \in X^N$ and assigns the ID number, ID$\in$M, M={1, 2, . . . , |M|} to this content. The content owner also possesses a secret key k$\in$K. The fingerprint extractor (FP) generates the fingerprint $b_x \in B^L$, where B={0, 1}, based on the mapping $\psi: X^N \times K \to B^L$. The generated fingerprint $b_x$ together with the assigned ID are stored in a database. At the identification stage, for a given query y, which might result either from the enrolled content x or an unrelated one $x' \in X^N$, the FP estimates the fingerprint $b_y$ by mapping $g: Y^N \times K \to B^L$ and the decoder produces ID or rejects the query.

Digital watermarking is another approach to content protection, based on a different concept. Nowadays, digital watermarking is a well-studied domain where lots of efforts have been put on the investigation of its performance, see, e.g., the article "Digital Watermarking" by I. J. Cox, M. L. Miller, and J. A. Bloom, Morgan Kaufmann Publishers (Academic Press), 2002, and more recently on its security, see e.g. the article "Spread spectrum watermarking security" by L. Pérez-Freire and F. Pérez-González, IEEE Trans. on Information Forensics and Security, Vol. 4, No. 2-24, pp. 969-978, March 2009. In the context of shortly reviewing this topic here, only the main groups of watermarking methods that are based on known host, also known as quantization index modulation or random binning-based methods, and known statistics methods, also known as spread spectrum based methods like described in the article "Performance analysis of existing and new methods for data hiding with known-host information in additive channels" by F. Pérez-González, F. Balado, and J. R. Hernández, IEEE Trans. on Signal Processing, Vol. 51, No. 4, April 2003, shall be considered in the following.

Figure 1B:
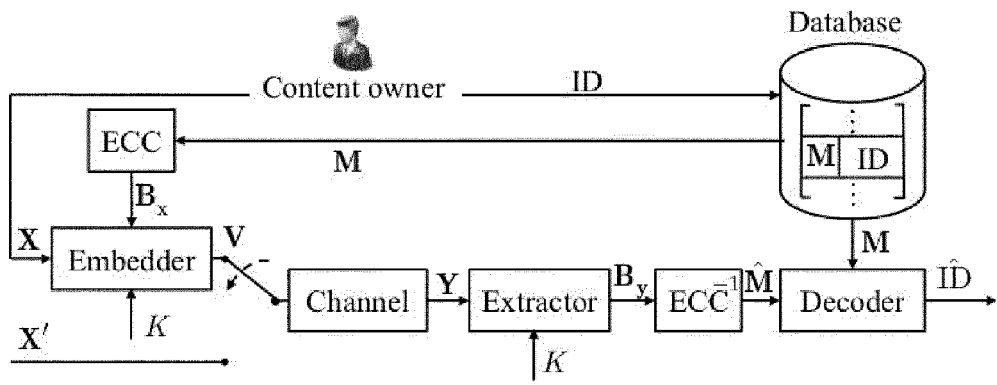
FIG. 1b schematically illustrates the principle steps of a conventional method for digital watermarking.

In order to introduce a uniform consideration of problems related to the above mentioned pCFP as well as to watermarking, the diagram of FIG. 1b illustrating schematically and in generalized manner the principle steps of a conventional method of digital watermarking shall be briefly discussed. The essential difference between the two above mentioned approaches is that in fingerprinting, a content owner only assigns some ID number to the content x, while in digital watermarking, one can mark every individual copy of content x by embedding a message m that by analogy to pCFP is assumed to encode the L character message from the alphabet B, i.e., $m \in B^L$. As schematically shown in FIG. 1$b$, within watermarking, at the embedding stage, the assigned ID number and the message m are stored in a database. Prior to the embedding, the message m is encoded into the codeword $b_x$ based on the mapping $\omega_{ECC}: B^L \to B^J$, where $J > L$ based on some error correction codes (ECC). The codeword $b_x$ is embedded into the content x, also called host, thus resulting into the marked copy v according to some specified measure of distortions and embedding function $\psi: X^N \times B^J \times K \to V^N$. Obviously, two operations of message encoding and embedding can be combined together. However, to highlight the similarity with pCFP and to reflect the way how most of practical digital watermarking methods are designed, these stages shall be considered here separately. Under this consideration, the role of a considered embedder consists in the content modulation. At the identification or reconstruction stage, analogously to pCFP, the extractor produces an estimate $b_y$ based on mapping $g: Y^N \times K \to B^J$. The estimation accuracy is evaluated based on the probability of bit error $P_b = \Pr\{B_x \neq B_y\}$ that is similar to pCFP. The goal of the next stage is to correct the errors in the estimate $b_y$ using the error correction mapping $\omega^{-1}_{ECC}: B^J \to B^L$, which should produce an estimate $\hat{m}$ of the original message m. The performance of the error correction decoder is evaluated based on the probability $P_m = 1/|M| \Sigma_{m \in M} \Pr\{M \neq \hat{M} | M = m\}$. The scheme is designed in such a way that the digital watermarking rate $R_{DW} = 1/N \log_2 |M|$ approaches the watermarking capacity $C_{DW} = I(U;X) - I(U;Y)$ for host sequences of length N, where U denotes the auxiliary random variable, this being described in more detail in the article "Coding for channel with random parameters" by S. Gel'fand and M. Pinsker, Problems of Control and Information Theory, Vol. 9, No. 1, pp. 19-31, 1980. The decoder should ensure a rejection option "Θ" that was not considered in said article by S. Gel'fand and M. Pinsker but that is automatically satisfied for strongly typical sequences in the theoretical analysis. In practice, the estimated message $\hat{m}$ is matched with the database to deduce the estimate of ID number based on in $\hat{m}$. If the rate of the ECC is chosen properly according to the probability of bit error $P_b$, the overall $P_m \to 0$ and there is no need in high complexity search procedures which need to be used in pCFP to deduce the estimate $\hat{ID}$ of ID. Therefore, digital watermarking has two advantages over pCFP, namely that (a) each copy of content x can be marked independently and that (b) there is no need in complex search procedures due to the usage of structured error correction codes contrary to the random fingerprint codes.

At the same time, practical digital watermarking techniques face the so-called host interference. To achieve host interference cancellation, special binning or quantization techniques are used. However, it was demonstrated that the latter are very insecure in comparison to spread spectrum based methods which suffer from the host interference, see, e.g., the above cited article "Performance analysis of existing and new methods for data hiding with known-host information in additive channels". This recalls for the trade off between the probability of error $P_b$, minimization of which requires an efficient host interference cancellation based on structured codes, and security, which, to the contrary, is characterized by the leaks to which are exposed all non-random code structures.

Unfortunately, little is known about the security of practical embodiments of pCFP. The secret key estimation in pCFP is not a well-studied problem, except some few contributions like, e.g., the article "On security threats for robust perceptual hashing" by O. Koval, S. Voloshynovskiy, P. Bas, and F. Cayre, published in Proceedings of SPIE Photonics West, Electronic Imaging/Media Forensics and Security XI, San Jose, USA, 2009. At the same time, it is intuitive that in pCFP—since the content is not modified in the framework of pCFP and if the database is handled properly—the attacker obtains much less information for the secret key estimation in contrast to digital watermarking. Additionally, pCFP does not require any embedding of messages into the host data and thus there is no need in efficient host cancellation.

In view of these facts, the present invention proposes a new hybrid technique that combines elements of both pCFP and digital watermarking to form an innovative method of content fingerprinting which allows to achieve a better trade off between performance, complexity and security. This novel technique shall in the following be referred to as active content fingerprinting (aCFP). FIG. 1$c$ schematically illustrates the principle steps of the new method of providing a fingerprint according to the present invention. The new aCFP model obeys the basic structure of pCFP but comprises an important difference at the enrolment stage. In short, according to the present invention, the aCFP method of providing a fingerprint comprises a modulator allowing to observe the input vector x and to generate the fingerprint $b_x$ as well as a modified vector v for a given key k and a specified distortion between x and v based on the mapping $\psi: X^N \times K \to B^L \times V^N$, such as will become clear in the course of the description. The vector v is created based on an evaluation of the content vector x in the space of secret carriers of a transform domain defined by the key k and replaces content x for all further steps of the method, in particular during the identification stage. The identification may therefore be performed according to the same principles as for pCFP.

It is important to point out that the resulting data v does not carry any embedded message. The sole purpose of this modulation step at the modulator, respectively encoder, is to decrease the probability of error $P_b$, which will have a crucial impact on both the overall system performance and complexity.

Therefore, in order to describe in detail the method according to the present invention as well as to underline its differences and advantages as compared to both pCFP and digital watermarking, the following shall examine in particular two aspects. Firstly, different embodiments of the presently proposed method with respect to the applied modulation strategy shall be discussed by evaluating the corresponding probability of bit error $P_b$ for aCFP in order to achieve a better robustness and a potentially faster search with respect to conventional pCFP. Secondly, a comparison of aCFP with pCFP as well as with digital watermarking, for the latter under the same distortion constraints, shall be performed in order to understand the significant advantages of the presently proposed method.

For this purpose, the basic mathematical framework used in both conventional content fingerprinting and digital watermarking shall be shortly introduced. Most fingerprinting and digital watermarking systems operate in some transform domain, where the direct—and inverse transforms are defined as:

$$\begin{cases} \tilde{x} = Wx, \\ x = W^{-1}\tilde{x}, \end{cases} \quad (1)$$

for the orthonormal matrix $W^{-1}=W^T$. It will be assumed here that the matrix $W \in \mathbb{R}^{N \times N}$, $W=(w_1, w_2, \ldots, w_N)^T$ consists of a set of basis vectors $w_i \in \mathbb{R}^N$ with $1 \leq i \leq N$. For the theoretical analysis, it will also be assumed that this transform is based on any randomized orthogonal matrix W (random projection transform) whose elements $w_{i,j}$ are generated from a Gaussian distribution N (0, 1/N) based on a secret key k. Such a matrix can be considered as an almost orthoprojector, for which $WW^T \approx I_N$, and the basis vectors are of a unit norm, such as demonstrated in the article "Information-theoretical analysis of private content identification" by S. Voloshynovskiy, O. Koval, F. Beekhof, F. Farhadzadeh, and T. Holotyak, in IEEE Information Theory Workshop, ITW2010, Dublin, Ireland, Aug. 30-Sep. 3 2010. In the following, an alternative representation of the direct and inverse transforms of equation (1) will be used, according to the equation:

$$\begin{cases} \tilde{x}_i = w_i^T x, 1 \leq i \leq N. \\ x = \sum_{i=1}^{N} \tilde{x}_i w_i = \sum_{i \in K} \tilde{x}_i w_i + \sum_{i \notin K} \tilde{x}_i w_i, \end{cases} \quad (2)$$

where a set $K=\{i_1, i_2, \ldots, i_L\}$ represents a set of indices defined by the secret key k. This representation corresponds to the direct generation of a set of secret basis vectors or carriers $w_i$, $i \in K$, with unit norm $\|w_i\|^2=1$, where the fingerprint is computed. This is related to digital watermarking techniques based on spread spectrum (SS)—or spread transform (ST) watermarking, like discussed by B. Chen and G. W. Women in "Quantization index modulation: A class of provably good methods for digital watermarking and information embedding", IEEE Trans. on Information Theory, Vol. 47, pp. 1423-1443, May 2001, and subspace projections (SSP), like discussed by R. F. H. Fischer and R. Bäuml in "Lattice costa schemes using subspace projection for digital watermarking", European Trans. Telecommunications, Vol. 15, pp. 351-362, 2004.

The selection of secret carriers is very important for both the robustness of the proposed scheme of aCFP and its security as well as the statistics of the projected coefficients. Therefore, without loss of generality, the further analysis will consider only carriers with disjoint supports due to their ability to generate independent projected coefficients and their wide usage in practical embodiments of fingerprinting and watermarking methods. It should also be pointed out that one can construct a secret scheme based on any publicly known orthogonal transforms such as discrete cosine transform (DCT), discrete wavelet transform (DWT), discrete Fourier transform (DFT) or even Fourier-Melline transform, to ensure invariance to certain geometric transformations, based on a key-dependent selection of L carriers. The indices of these carriers are considered as a set $K=\{i_1, i_2, \ldots, i_L\}$.

Within the framework of the model of conventional, passive content fingerprinting (pCFP), the original content x is not modified and the fingerprint is computed directly from x using the projections onto a set of secret vectors $w_i$, $i \in K$ and quantization resulting into:

$$b_{x_i} = \text{sign}(w_i^T x) = \text{sign}(\tilde{x}_i). \quad (3)$$

where $\tilde{x}_i = w_i^T x$ and $\text{sign}(x) = +1$ for $x \geq 0$ and $-1$ otherwise, see also the upper part of FIG. 1a. This process is distortionless and x remains intact.

Moreover, an additive model of distortions can be assumed for some robust feature extraction domains including SIFT descriptors, where the Euclidean metric or the Mahalanobis distance, which are the maximum likelihood (ML) counterparts for the independent identically distributed (i.i.d.) additive and correlated Gaussian noise, respectively, are used for the descriptor matching, see e.g. the article "Distinctive image features from scale-invariant keypoints" by D. Lowe, IJCV, Vol. 60, No. 2, pp. 91-110, November 2004. Assuming thus an additive noise observation channel of the type:

$$y = x + z, \quad (4)$$

one is interested to estimate the level of degradations to the fingerprint extracted from the degraded content y. For reasons of comparison, the performance of all methods will be considered here under an additive white Gaussian noise. To quantify the level of signal distortions, the document-to-noise ratio (DNR) will be used, which is defined as:

$$DNR = 10 \log_{10}\left(\frac{\frac{1}{N}E[\|X\|_2^2]}{\frac{1}{N}E[\|Z\|_2^2]}\right) = 10 \log_{10}\left(\frac{\sigma_x^2}{\sigma_z^2}\right), \quad (5)$$

where $\|\cdot\|_2$ stands for Euclidean norm, and under the assumption that all signals are zero-mean Gaussian vectors, i.e., $X \sim N(0, \sigma_X^2 I_N)$ with the variance $\sigma_X^2$ and noise is also zero-mean Gaussian, $Z \sim N(0, \sigma_Z^2 I_N)$ with the variance $\sigma_Z^2$, where $I_N$ is a unit matrix of size N×N.

Given a secret key k and the corresponding set of secret carriers, the query for fingerprint extraction is performed as:

$$b_{y_i} = \text{sign}(w_i^T y) = \text{sign}(\tilde{x}_i + \tilde{z}_i), i \in K \quad (6)$$

where $\tilde{z}_i = z^T w_i$, such as indicated symbolically in the lower part of FIG. 1a; it should be noted here that soft fingerprinting where the extracted fingerprint also consists of additional information about bit reliabilities is not considered. The projected original content and noise coefficients are distributed as $\tilde{X} \sim N(0, \sigma_X^2)$ and $\tilde{Z} \sim N(0, \sigma_Z^2)$.

The performance of pCFP in terms of probability of bit error rate (BER) is measured, as described in the article "Information-theoretical analysis of private content identification" mentioned above, as:

$$P_{b\text{-}pCFP} = Pr\{B_x \neq B_y\} = \quad (7)$$

$$E_{f(|\tilde{x}|)}\left[Q\left(\frac{|\tilde{X}|}{\sigma_z}\right)\right] = \frac{1}{\pi}\arctan\left(\frac{\sigma_z}{\sigma_x}\right), \quad (8)$$

where $Q(\cdot)$ indicates the Q-function.

Figure 1C:
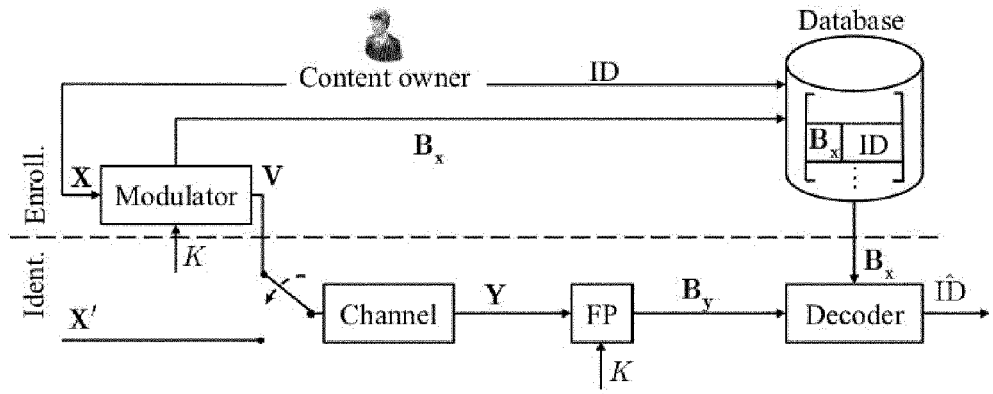
FIG. 1c schematically illustrates the principle steps of a method of providing a fingerprint according to the present invention.

Following the above detailed description of the mathematical basis as well as of the model of conventional, passive content fingerprinting, the method of providing a fingerprint according to the present invention shall now be described in detail, including its mathematical description. As already shortly mentioned above, in the framework of active content fingerprinting (aCFP) such as proposed by the present invention and contrary to pCFP, the original content x shall be modulated, i.e., modified, in the space of secret carriers defined by the key k such as to produce a modulated content vector v, this with the overall goal to minimize the BER defined according to equation (7). For this purpose, a general form of a modulation in the framework of aCFP is defined as:

$$v = \sum_{i=1}^{N} \varphi_i(\tilde{x}_i) w_i = \sum_{i \in K} \varphi_i(\tilde{x}_i) w_i + \sum_{i \notin K} \tilde{x}_i w_i, \quad (9)$$

where $\phi_i(\cdot)$ denotes a modulation function applied to the i-th coefficient belonging to the set of secret carriers, this being symbolized if FIG. 1c at the box denoted "Modulator". In the following, it shall be assumed—except where stated else—that the same function $\phi(\cdot)$ is applied to all coefficients in the set of secret carriers; however, other embodiments of the proposed method will be discussed in the later course of the description which may apply different types of functions $\phi_T(\cdot)$ to the coefficients in the set of secret carriers. Since the BER according to equation (8) is defined by the magnitudes of the projected coefficients $|\tilde{x}|$, the present invention proposes a method of providing a fingerprint which increases these magnitudes with the help of a modulation limited by a defined distortion constraint.

A corresponding distortion measure per dimension between sequences x and v may be defined by:

$$D = \frac{1}{N} E[\|V - X\|_2^2] = \frac{1}{N} E[\|S\|_2^2], \quad (10)$$

where $S = \sum_{i \in K} (\phi(\tilde{X}_i) - \tilde{X}_i) w_i$
denotes the modulation signal that can be considered as a sort of watermark by analogy to digital watermarking. In the case of pCFP, D=0 while aCFP is characterized by a distortion determined by the modulation function $\phi(\cdot)$.

In order to allow a coherent comparison of the performance of aCFP with the one obtained by digital watermarking, there shall also be defined a document-to-watermark ratio (DWR) as:

$$DWR = 10 \log_{10} \left( \frac{\frac{1}{N} E[\|X\|_2^2]}{\frac{1}{N} E[\|S\|_2^2]} \right) = 10 \log_{10} \left( \frac{\sigma_{\tilde{x}}^2}{D} \right), \quad (11)$$

which should reflect the fact of content modification by the modulation signal S, acting in fact as a kind of embedded "watermark". However, obviously, there is an important difference between a watermark used in digital watermarking, which carries the information about the content owner, and the modulation signal introduced by the present invention for aCFP, which is solely used for reduction of the BER. Therefore, it would be more correct to use the term document-to-modulation signal ratio. However, to make a consistent comparison with digital watermarking, the term DWR will be used in the following assuming that the reader can clearly identify the difference between both techniques in view of the above explanations.

In the following, several modulation strategies allowing to design different embodiments of a method of providing a fingerprint according to the present invention shall be considered in terms of their performance and distortions.

A first embodiment of a method of providing a fingerprint according to the present invention may be called additive active content fingerprinting (AddaCFP) and is defined by a modulation function of the form:

$$\phi_A(\tilde{x}_i) = \tilde{x}_i + \alpha \operatorname{sign}(\tilde{x}_i), \quad (12)$$

for $i \in K$, where $\alpha > 0$ stands for the strength of aCFP. Substituting equation (12) into equation (9) yields $$v = \sum_{i \in K} (\tilde{x}_i + \alpha \operatorname{sign}(\tilde{x}_i)) w_i + \sum_{i \notin K} \tilde{x}_i w_i = x + \alpha \sum_{i \in K} \operatorname{sign}(\tilde{x}_i) w_i = x + s_A,$$

where the modulation signal is defined as: $s_A = \alpha \sum_{i \in K} \operatorname{sign}(\tilde{x}_i) w_i$.

The distortion of the embodiment AddaCFP per content sample is:

$$D_A = \frac{1}{N} E[\|S_A\|_2^2] = \frac{1}{N} E\left[ \alpha^2 \left\| \sum_{i \in K} \operatorname{sign}(\tilde{x}_i) w_i \right\|_2^2 \right] \stackrel{(a)}{=} \frac{L}{N} \alpha^2,$$

where (a) follows from the fact that $\tilde{X}_i$ are i.i.d. Consequently, the DWR under the AddaCFP is $DWR_{Add} = 10 \log_{10}(N/L \sigma_{\tilde{x}}^2 / \alpha^2)$.

As schematically illustrated in FIG. 1c, the fingerprint extraction at the enrolment stage of the method AddaCFP can be performed, based on v, as $$b_{y,i} = \operatorname{sign}(w^T_i v) = \operatorname{sign}(\tilde{x}_i + \alpha \operatorname{sign}(\tilde{x}_i)), i \in K.$$

Also, the lower part of FIG. 1c schematically illustrates that the fingerprint computed at the verification stage is:

$$b_{y,i} = \operatorname{sign}(w^T_i y) = \operatorname{sign}(\tilde{x}_i + \alpha \operatorname{sign}(\tilde{x}_i) + \tilde{z}_i), i \in K$$

where y=v+z.

The performance of AddaCFP, determined in terms of the BER, is given by:

$$P_{b-AddaCFP} = E_{f(\varphi_A(\tilde{X}))} \left[ Q \left( \frac{|\varphi_A(\tilde{X})|}{\sigma_z} \right) \right] =$$

$$\stackrel{(a)}{=} 2 \int_0^\infty Q\left( \frac{\tilde{x} + \alpha}{\sigma_z} \right) \frac{1}{\sqrt{2\pi \sigma_{\tilde{x}}^2}} \exp\left( \frac{-\tilde{x}^2}{2\sigma_{\tilde{x}}^2} \right) d\tilde{x} \quad (13)$$

$$\stackrel{(b)}{\leq} \exp\left( -\frac{\alpha^2}{2\sigma_Z^2} \right) P_{b-pCFP}. \quad (14)$$

where (a) results from $\phi_A(\tilde{X})$ follows the following pdf:

$$f(\varphi_A(\tilde{x})) = \begin{cases} N(\alpha, \sigma^2 x), \tilde{x} \geq \alpha, \\ N(-\alpha, \sigma^2 x), \tilde{x} \leq -\alpha, \end{cases} \quad (15)$$

and (b) follows from the inequality $Q(x+t) \leq \exp(-t^2/2) Q(x)$ for x, t≥0. The difference between the BER of pCFP according to equation (8) and the one of AddaCFP is in the positive bias α introduced by the additive modulation that, according to equation (14), reduces the BER of AddaCFP by at least a factor of $\exp(-\alpha^2 / 2 \sigma_Z^2)$.

In this context, one should note that improved spread spectrum (ISS) watermarking is a watermarking method aiming at host interference cancellation in the projected domain with the embedding rate $R_{DW} = L/N$ bits. Such as exposed in the article "Improved spread spectrum: A new modulation technique for robust watermarking" by H. S.

Malvar and D. A. F. Florencio, IEEE Trans. on Signal Processing, Vol. 51, No. 4, pp. 898-905, April 2003. ISS watermarking uses $$v = x + \nu \sum_{i \in K} b_{x_i} w_i - \lambda \sum_{i \in K} \tilde{x}_i w_i, \tag{16}$$

where $\nu$ and $\lambda$ control the strength of the watermark and host cancellation, respectively, $b_{x_i} = (-1)^{m_i}$ and $m_i \in \{0, 1\}$. The notation $b_{x_i}$ is introduced by purpose to reflect the link with the extracted bits in pCFP. Also, the presented multi-bit formulation of ISS has two differences with the one-bit ISS originally proposed in said article, namely that the third term is not normalized and L-bit embedding is considered. Under the assumption of unit norm basis vectors, the embedding distortion of ISS watermarking is:

$$D = L/N(\nu^2 + \lambda^2 \sigma^2_{\tilde{x}}). \tag{17}$$

Although the proposed new method of AddaCFP and ISS watermarking therefore present some mathematical similarities, the objectives behind these two techniques are quite different. Since AddaCFP does not target any data hiding, one can disregard, for the purpose of comparison, the watermark embedding component in the above equations by setting $\nu = 0$. Thus, the AddaCFP counterpart of ISS can be obtained as:

$$v = x + \lambda \sum_{i \in K} \tilde{x}_i w_i, \tag{18}$$

where the sign of interference cancellation is replaced by the opposite to ensure host amplification. The ISS-based modulation is only efficient for large values of $\tilde{x}_i$, while the coefficients close to zero do not obtain significant amplification. At the same time, these small-value coefficients represent the main source of bit errors due to the sign flipping of bits occurring, of course, primarily at small values of $\tilde{x}_i$, i.e. at coefficients close to zero. That is why, contrary to the host interference cancellation in digital watermarking, the proposed method of AddaCFP is designed to increase these small-value coefficients of the vector components of content x in the space of secret carriers of the transform domain defined by the key k, by creating a corresponding modulated content vector v, such as to optimally avoid sign flipping of bits when extracting the fingerprint from the modulated content v.

Finally, the BER of ISS watermarking corresponds to the mismatch of embedded and extracted bits and is defined, such as mentioned in the above cited article "Improved spread spectrum: A new modulation technique for robust watermarking", as:

$$P_{b-ISS} = Q\left(\sqrt{\frac{(\alpha^2 - \lambda^2 \sigma^2_{\tilde{X}})}{\sigma^2_Z + (1-\lambda^2)\sigma^2_{\tilde{X}}}}\right), \tag{19}$$

with the optimal $$\lambda_{opt} = \frac{1}{2}\left(1 + \frac{\sigma^2_Z}{\sigma^2_{\tilde{X}}} + \frac{\alpha^2}{\sigma^2_{\tilde{X}}}\right) - \frac{1}{2}\sqrt{\left(1 + \frac{\sigma^2_Z}{\sigma^2_{\tilde{X}}} + \frac{\alpha^2}{\sigma^2_{\tilde{X}}}\right)^2 - 4\frac{\alpha^2}{\sigma^2_{\tilde{X}}}}$$

which minimizes the above BER for the embedding distortion $D_{ISS} = D_A$.

For purposes of comparison, one may also consider SS-based watermarking which suffers from host interference and the BER of which can be obtained from the BER of ISS by assigning $\lambda = 0$ that results in:

$$P_{b-SS} = Q\left(\sqrt{\frac{\alpha^2}{\sigma^2_Z + \sigma^2_{\tilde{X}}}}\right). \tag{20}$$

In sum, by applying a modulation for small values of i.e., for small-value coefficients, AddaCFP allows to eliminate, respectively at least to significantly reduce the main source of bit errors due to the sign flipping of bits and thus provides a robust and secure fingerprint.

A second embodiment of a method of providing a fingerprint according to the present invention may be called quantization-based active content fingerprinting (QBaCFP) and is defined by a modulation function of the form:

$$\phi_Q(\tilde{x}_i) = c\,\text{sign}(\tilde{x}_i) = \tilde{x}_i + c\,\text{sign}(\tilde{x}_i) - \tilde{x}_i = \tilde{x}_i + (c - |\tilde{x}_i|)\text{sign}(\tilde{x}_i).$$

Substituting equation (21) into equation (9) yields:

$$v = \sum_{i \in K}(\tilde{x}_i + (c - |\tilde{x}_i|)\text{sign}(\tilde{x}_i))w_i + \sum_{i \notin K}\tilde{x}_i w_i = x + \sum_{i \in K}(c - |\tilde{x}_i|)\text{sign}(\tilde{x}_i)w_i.$$

The distortion of QbaCFP is:

$$D_Q = \frac{1}{N}E\left[\left\|\sum_{i \in K}(c - |\tilde{X}_i|)\text{sign}(\tilde{X}_i)w_i\right\|^2_2\right] =$$

$$\frac{L}{N}E[(|\tilde{X}| - c)^2] \stackrel{(a)}{=} \frac{L}{N}\left(\sigma^2_{\tilde{X}} - 2c\sigma_{\tilde{X}}\sqrt{\frac{2}{\pi}} + c^2\right),$$

where (a) follows from $$E[|\tilde{X}|] = \sigma_{\tilde{X}}\sqrt{\frac{2}{\pi}}$$

for the half-normal distribution.
for the half-normal distribution.

The BER of QbaCFP is given by:

$$P_{b-QbaCFP} = E_{f(\varphi_Q(\tilde{X}))}\left[Q\left(\frac{|\varphi_Q(\tilde{X})|}{\sigma_Z}\right)\right] \stackrel{(a)}{=} Q\left(\frac{c}{\sigma_Z}\right), \tag{21}$$

where (a) follows from:

$$f(\varphi_Q(\tilde{x})) = \begin{cases} 1/2\delta(\tilde{x}-c), & \tilde{x} \geq 0, \\ 1/2\delta(\tilde{x}+c), & \tilde{x} < 0, \end{cases} \tag{22}$$

For simple comparison of QbaCFP with AddaCFP, ISS and SS, their average distortions may be made equal by forcing $D_Q = D_A = L/N\,\alpha^2$ that results in:

$$P_{b-QbaCFP} = Q(\eta/\sigma_Z) \tag{23}$$

where $$\eta = \sigma_X \sqrt{\frac{2}{\pi}} \left(1 + \sqrt{1 + \frac{\pi}{2}\left(\frac{\alpha^2}{\sigma_X^2} - 1\right)}\right).$$

It is also known in rate-distortion theory that the reconstruction level c that minimizes the distortion of a one-bit scalar quantizer, which somewhat corresponds to the modulation function of QbaCFP, is equal to the mean value of the region, i.e.

$$D_Q = \sigma_X^2 L/N(1 - 2/\pi), \quad (24)$$

$$P_{b-QbaCFP} = Q\left(\sqrt{\frac{2}{\pi}} \frac{\sigma_X}{\sigma_Z}\right). \quad (25)$$

that yields:

$$c = E[|\overline{X}|] = \sigma_X \sqrt{\frac{2}{\pi}}$$

Finally, the maximum achievable DWR by using the new method of QbaCFP, which corresponds to the minimum distortion of equation (24), is:

$$DWR_Q = 10 \log_{10}(N/(L^*(1-2/\pi)).$$

In this context, one could note that spread-transform dither modulation (ST-DM) watermarking is a hybrid watermarking method aiming at host interference cancellation in the projected domain, which combines a quantization (binning) strategy with a spread transform with the embedding rate $R_{DW}=L/N$ bits, such as explained in the above mentioned article "Quantization index modulation: A class of provably good methods for digital watermarking and information embedding". ST-DM watermarking uses:

$$v = x + \mu \sum_{i \in K} (Q_{m_i}(\overline{x}_i) - \overline{x}_i) w_i, \quad (26)$$

where $0 \leq \mu \leq 1$ is a distortion compensation parameter, and $Q_{mi}(\cdot)$ is a scalar quantizer, which is defined by the bit $m_i$ with the centroids defined by:

$$c_i = \Delta Z + (-1)^{m_i} \Delta/4, \text{ for } m_i = 0, 1, \quad (27)$$

by considering only binary embedding here.

By rewriting equation (21) in the form of equation (26) by introducing the distortion compensation parameter α, one obtains:

$$v = x + \alpha \sum_{i \in K} (c\text{sign}(\overline{x}_i) - \overline{x}_i) w_i, \quad (28)$$

with the remarkable correspondence in the part of quantizations $Q_{mi}(\cdot)$ and csign(·). However, the fundamental difference between ST-DM watermarking and QbaCFP consists in the absence of a periodical structure of the ST-DM quantizer depending on the message bit $m_i$, which should compensate the interference with the host signal.

The BER of ST-DM watermarking can be found in, e.g., in the above cited article "Performance analysis of existing and new methods for data hiding with known-host information in additive channels". There are also other modifications of this basic scheme, such as mentioned, e.g., in the above cited article "Lattice costa schemes using subspace projection for digital watermarking". However, instead of considering all of them, a lower bound on the performance of both spread transform and quantization methods shall be provided in the assumption of no host interference and binary modulation. This bound should serve as a basis for the comparison with the embodiments of the presently proposed aCFP method. The lower bound on the BER of all watermarking techniques in assumption of host interference absence and binary embedding is defined as $$P_{b-LB} = Q(\alpha/\sigma_Z). \quad (29)$$

In the case of the proposed method of QbaCFP, similarly to AddaCFP, one is only interested in increasing the magnitudes of small components in the set K of the transform domain which is simply achieved by the quantization. The cost for this simplicity are the distortions of all components whose values are larger than the centroid c and their decrease that might amount to an increase of the probability of bit error for these values. Therefore, one might imagine further embodiments of the method of providing a fingerprint according to the present invention comprising even more advanced modulation strategies that quantize or, by generalizing, that modulate the low-magnitude coefficients to some prettified levels while preserving or modulating to a lesser extent the large-magnitude coefficients. This should provide an additional gain in the introduced distortion for the same robustness to the degradations. One can also assume multilevel quantization $Q(\tilde{x}_i)$ instead of a one-bit scalar quantizer csign($\tilde{x}_i$). It should be noted here that $Q(\tilde{x}_i)$ does not depend on $m_i$ as in equation (26).

Figure 2A:
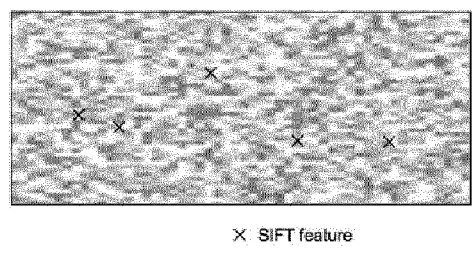
FIGS. 2a and 2b schematically illustrate a specific vector modulation scheme used in combination with lattice quantization in an embodiment of a method of providing a fingerprint according to the present invention, such modulation allowing to provide an invariance to geometric transformations by exploiting for example the SIFT features of an image.
Figure 2B:
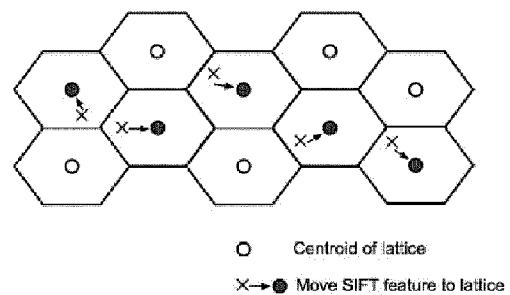

Another embodiment of a method according to the present invention includes the extension of the scalar modulation considered in the previous cases to vector modulation. The application of vector modulation in the framework of aCFP might bring three additional enhancements in comparison to scalar modulation. The first enhancement concerns the possibility to take into account the residual correlation that still exists between the transformed coefficients due to the mismatch between the actual correlation that is not stationary over the data and the assumed stationary model used in the design of the transform. If application of vector modulation for aCFP might produce the same performance in terms of probability of bit error $P_b$, it is nevertheless interesting since it will produce a lower distortion during the modulation. The advantages of vector quantization over scalar quantization in this domain will be similar to lossy source compression applications, such that there is no need to describe this aspect in all detail. The second enhancement is related to the possibility to perform fast identification when properly designed lattices are used as a vector modulation counterpart of quantization based aCFP methods. Finally, the third enhancement concerns the possibility to modulate the robust features using a specific vector modulation that will additionally provide an invariance to geometric transformations. An example of such a modulation in combination with lattice quantization is schematically illustrated in FIGS. 2a and 2b. In fact, the so called scale-invariant feature transform (SIFT) features can be used for obtaining said geometric invariance. To do so, the SIFT features are extracted from the image in known manner, like symbolically indicated in FIG. 2a. Then, according to the present invention, the positions of the SIFT features within the image are quantized to the centroids of a lattice quantizer used for the proposed method of aCFP, especially in QbaCFP, such as symbolically shown in FIG. 2b. Finally, the image modulation is performed accordingly, by use of an adequate vector modulation such as mentioned above, to satisfy their detection in the defined positions.

For still another embodiment of a method according to the present invention it is proposed to include an auto error-correction capability into aCFP. In this case, instead of using L components for the modulations such as described here above, (L+J) components are used for the modulation, where L components are considered as informative, i.e., represent the content x, and J as complementary. The role of the latter J components is solely to correct errors in the L components. The number of J components is chosen in dependence of the expected distortions in the L components. For example, in the binary case, if the average number of error bits in the L components is $LP_b$, where $P_b$ is the average probability of bit error, a good estimate of J is $J \geq LH_2(P_b)$, where $H_2(\cdot)$ denotes the binary entropy. These J components can be considered as parity check bits by analogy to known error correction codes.

Therefore, in this embodiment of a method of aCFP, the modulation of the L components is performed like in the above described cases of aCFP, where these components do not carry any information. To the contrary, the added J components should carry information about parity check bits. In turn, this means that the modulation of the corresponding components in the transformed domain should be accomplished analogously to digital watermarking by using spread spectrum or quantization based modulation to cancel any interference with the host data. The modulated data is then transformed back to the original domain. At the verification stage, verification of the fingerprint is performed similar to what has been mentioned here above for the proposed aCFP, i.e., the first L components are extracted such as previously explained and then the decoder corrects the remaining errors based on the J parity bit components. Therefore, the resulting L bits will contain less errors, such that a more efficient low complexity identification can be performed. In this context, one may note that the impact of probability of bit error on the complexity of bounded distance decoder is discussed in general in a contribution to the IEEE Information Theory Workshop by S. Voloshynovskiy, O. Koval, F. Beekhof, F. Farhadzadeh, and T. Holotyak, ITW2010, Dublin, Ireland, Aug. 30 to Sep. 3, 2010.

It is clear that the features of the above described embodiments of aCFP may be combined as far as not incompatible or being alternatives. Thus, without it being necessary to enumerate and describe in all detail all further embodiments of a method according to the present invention that are conceivable in view of the above technical instructions and that are situated within the scope of the present invention, the above description clearly underlines the basic principles and advantages of aCFP methods according to the present invention as compared to existing pCFP and digital watermarking methods.

Figure 3:
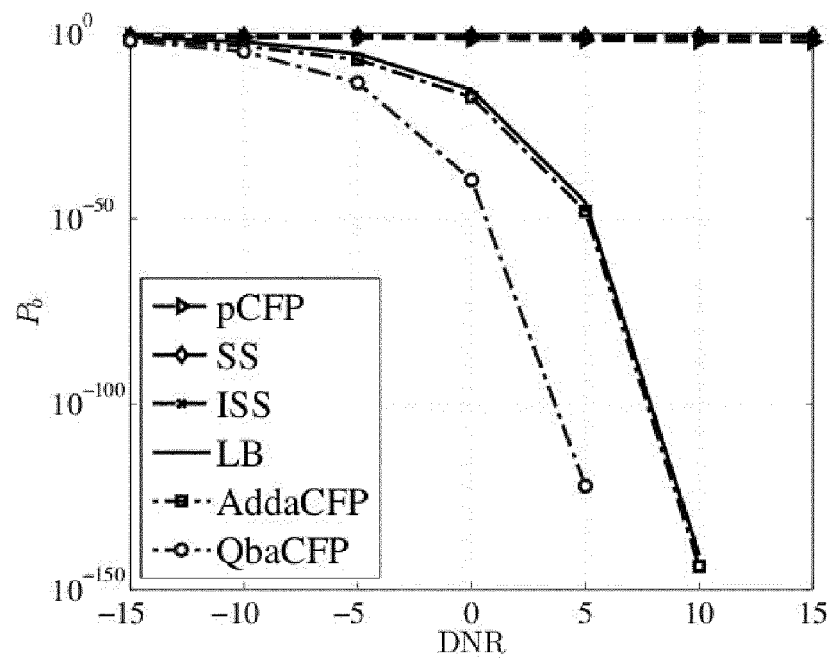
FIG. 3 illustrates the performance of conventional fingerprinting, of digital watermarking, and of fingerprinting according to the present invention in terms of the probability of bit errors between the fingerprints extracted from the original and distorted contents.

The techniques having been considered in detail here above are summarized in Table I as well as in FIG. 3 in terms of their probability of bit error $P_b$ for the same embedding distortion besides pCFP which has a distortion of D=0. In particular, FIG. 3 showing a comparison of BERs in watermarking and fingerprinting approaches, for an example with $\sigma_X=1$, N=2048, L=32, and DWR=20 dB, clearly underlines that the method of providing a fingerprint according to the present invention pushes the probability of bit error $P_b$ for aCFP beyond the theoretical limits which have for a long time been taken as given for pCFp, respectively for digital watermarking methods.

TABLE I

COMPARISON OF DIGITAL WATERMARKING. PCFP AND ACFP METHODS.

| Technique | Distortion D | Probability $P_b$ |
|---|---|---|
| Watermarking | | |
| SS | $\frac{L}{N}\alpha^2$ | $Q\left(\frac{\alpha}{\sqrt{\sigma_X^2 + \alpha_Z^2}}\right)$ |
| ISS | $\frac{L}{N}\alpha^2$ | $Q\left(\sqrt{\frac{(\alpha^2 - \lambda^2 \sigma_X^2)}{\sigma_Z^2 + (1-\lambda^2)\sigma_X^2}}\right)$ |
| Lower bound (LB) | $\frac{L}{N}\alpha^2$ | $Q\left(\frac{\alpha}{\sigma_Z}\right)$ |
| Fingerprinting | | |
| pCFP | 0 | $\frac{1}{\pi}\arctan\left(\frac{\sigma_Z}{\sigma_X}\right)$ |
| AddaCFP | $\frac{L}{N}\alpha^2$ | $E\left[Q\left(\frac{|\tilde{X}|+\alpha}{\sigma_Z}\right)\right]$ |
| QbaCFP | $\frac{L}{N}\alpha^2$ | $Q\left(\frac{\eta}{\sigma_Z}\right)$ |

These results are confirmed by a simulation on synthetic Gaussian sequences up to a level of precision ensured by 100,000 sequences observed in 100 noise realizations. Both AddaCFP and QbaCFP considerably outperform pCFP and digital watermarking in terms of the probability of bit error $P_b$. The reduction of the probability of bit error $P_b$ has significant impact on both the complexity and the security of aCFP methods according to the present method.

Figure 4A:
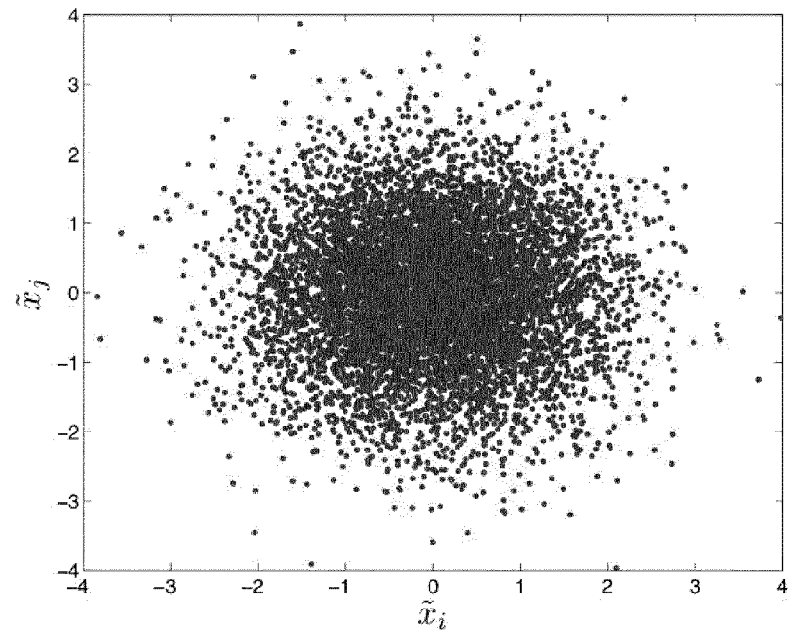
FIG. 4a shows an example of coefficients of a content x projected in the space of secret carriers of a transform domain defined by the key k, whilst
Figure 4B:
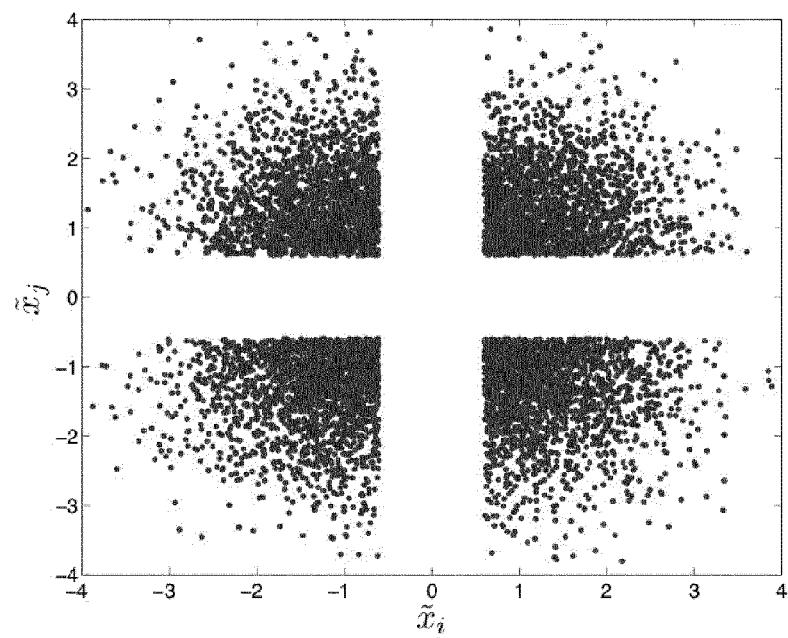
FIGS. 4b and 4c show examples of the same coefficients being projected in the transform domain by applying content modulation strategies adapted to be used within the scope of active content fingerprinting according to the present invention.
Figure 4C:
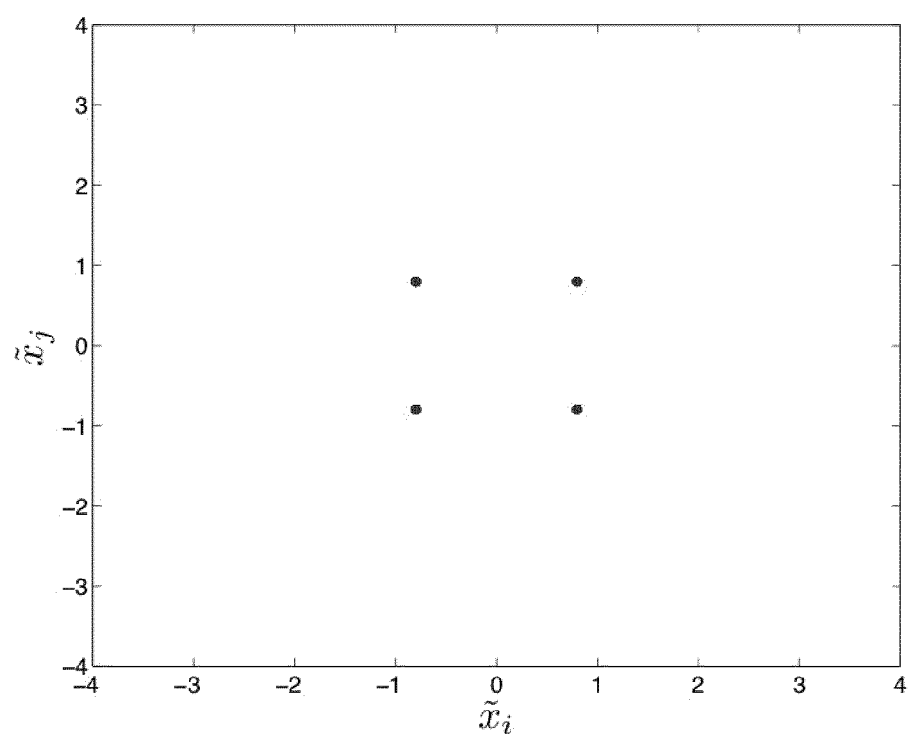

To exemplify the effect of aCFP-based modulation, an experiment has been performed with 1,000,000 Gaussian sequences of length N=2048 that have been projected to a secret subspace with L=32, i.e., in general to the space of secret carriers of the transform domain defined by the key $k \in K$. The resulting distribution of two such projections $\tilde{x}_i$ and $\tilde{x}_j$ is shown in FIG. 4a, for an example of DWR=17 dB. The resulting projected coefficients then have been modulated according to the above described methods of AddaCFP and QbaCFP, the result of these operations being shown in FIGS. 4b and 4c, respectively. Such as clearly visible in these figures, the method of AddaCFP according to equation (13) produces a bias to all coefficients proportional to $\alpha$, while the method of QbaCFP according to equation (21) quantizes each coefficient based on a one-bit scalar quantizer to the level c, depending on the sign.

In sum, the present invention introduces the concept of aCFP, meaning to apply a modulation on the coefficients of the vector components of content x in the space of secret carriers of the transform domain defined by the key k, based on several practical implementations such as additive and quantization methods, such as to produce a modulated content vector v allowing to reduce the probability of bit error $P_b$. It should be pointed out that besides its remarkable performance in terms of the probability of bit error $P_b$, aCFP is not intended to replace digital watermarking in applications like copyright protection. However, it could be considered as a reasonable alternative in those applications that require content related management, tracking, tracing and monitoring.

Finally, it should be noted that the present invention is also related to computer program means stored in a computer readable medium adapted to implement the method proposed above. Any person skilled in the art will indeed be enabled by the above technical instructions to produce an adequate computer program realizing the aCFP according to the present invention.

Furthermore, it is clear that use of the method disclosed herein may be made in several applications, in particular for the protection of digital media, of printed documents, and/or of physical objects, and/or for content and/or object authentication, identification, and/or detection of local modification, and/or content related management, tracking, tracing and/or monitoring.

In fact, with respect to the use of the above method in the context of digital objects, media, or content, for example, in the form of digital images, films, digitally reproduced text, or the like, application of the proposed scheme is direct and does not need any further explanation. If applied to physical objects, e.g., for its authentication, identification, or tracking, the proposed method may also be applied directly such as explained in detail here above. For example, a printout of a given content, like an image, which has been modulated according to the presently proposed method may be physically attached to a product which needs to be authenticated, identified, or tracked. Alternatively, the modulated image may also be directly reproduced on the product, respectively in general on the physical object, for example by use of laser technology or any other adequate technology depending on the product, respectively in general on the type of physical object.

Moreover, application of the method according to the present invention to physical objects may also be subject of certain constraints. To reuse the above mentioned example, it is possible that an image which is to be modulated according to the present method and then reproduced on a given surface of the physical object for authentication, identification, or tracking of the latter may not be reproduced all over the entire surface of the object, due to the physical properties or the type of the physical object, or for other similar reasons. In that case, it is possible to construct a specific modulation function that will perform a modulation of the content x in the transform domain according to the present invention, but in such a way that it introduces only local modifications to the content x, resulting in a modulated content v which in the direct domain, i.e., in the version to be physically reproduced on the object, comprises modifications only in the parts of the object surfaces which are effectively adapted to receive the modulated image, e.g., to ensure only modifications on specific locations of the object surface using for example laser engraving, respectively any other adequate technology. To generalize, it is therefore possible, based on known constraints for a given physical object, to design a specific modulation function which is adapted to perform a modulation of content x in the transform domain that takes into account said constraints on the physical object in the direct domain. Alternatively, depending on the physical object, it may also be possible to modulate the structure of a physical object directly to be compatible with the desirable properties of a modulated content v such as generated by the proposed method. Applications like the one mentioned above might be very useful for certain articles intended for the mass market.

In light of the above description of a method of providing a fingerprint according to the present invention, its advantages are clear. Primarily, as compared to conventional "passive" content fingerprinting, "active" content fingerprinting according to the present invention realizes a selective or adaptive content modification in the transform and/or secret transform domains, however, without embedding any specific message like in digital watermarking. The content modification serves in this case only for enhancement of reliable fingerprint extraction after modification and for minimization of the probability of bit errors between the fingerprints extracted from the original and distorted contents. As a consequence, it enables either direct identification without any need of highly complex search procedures or necessitates only a comparatively low-complexity search. For the same reason, there is no need in any interference cancellation like in the case of digital watermarking. Moreover, active content fingerprinting such as proposed herein produces an average bit error that outperforms in several orders of magnitude the same parameter for the best known techniques of conventional content fingerprinting and digital watermarking techniques. Finally, due to the absence of special structured codes introducing redundancy, also the level of security is higher than the one of digital watermarking. There exist several possible content modulation strategies adapted to be used within the scope of active content fingerprinting such as disclosed in the present application, e.g. additive, scalar and vector (lattice) quantization and distortion minimized modulations. The new framework named active content fingerprinting therefore takes the best from the two worlds of content fingerprinting and digital watermarking to overcome some of the fundamental restrictions of these techniques in terms of performance and complexity and, by extending the encoding of conventional content fingerprinting in a way analogous to digital watermarking, allows extraction of fingerprints from the modified cover data in a much more reliable manner. Obviously, the method may be used in various applications directed to the protection of digital and/or physical objects or content.

The invention claimed is:

1. A method of providing a robust and secure computer-generated fingerprint for digital content, the method comprising, at an enrolment stage, the steps of:
   (a) providing a content x of a set of contents $X^N$ for which a fingerprint is to be provided,
   (b) assigning an ID number to said content x,
   (c) providing a secret key k of a set of secret keys K,
   (d) using a processor to generate a fingerprint $b_x$ of a set of fingerprints $B^L$ based on content x and secret key k by use of a mapping function, the mapping function of the general form $\psi: X^N \times K \to B^L$,
   (e) storing the generated fingerprint $b_x$ together with the assigned ID in a database,
   and, at an identification stage, the steps of
   (f) extracting, for a given query content y which might result either from the enrolled content x or an unrelated content x' of the set of contents $X^N$, an estimate fingerprint $b_y$ based on the given query content y, and secret key k by use of a mapping function of the general form $g: Y^N \times K \to B^L$, $Y^N$ being a set of query contents,
   (g) producing an estimated ID number based on said estimate fingerprint by for identifying the content x using said ID number stored in the database, or else rejecting the query,
   wherein generating the fingerprint $b_x$, comprises the step of (h) using a processor to modulate the content x in a space of secret carriers of a transform domain defined by the key k by use of a mapping of the general form $\psi:X^N \times K \rightarrow B^L \times V^N$, $V^N$ being a set of modulated contents, such as to produce a modulated content vector v, said content v comprising content that is content x changed by the mapping function based on secret key k, replacing content x in the set of contents $X^N$ and being adapted to be used during the identification stage in steps (f) and (g).

2. The method according to claim 1, wherein said modulation increases magnitudes of at least small coefficients of vector components of content x in the space of secret carriers of said transform domain defined by the key k for allowing to reduce the probability of bit error $P_b$ of the modulated content vector v during extraction of the fingerprint $b_x$.

3. The method according to claim 1, wherein modulating the content x in said transform domain is done according to a mapping of the general form:

$$v = \sum_{i=1}^{N} \varphi_i(\bar{x}_i)w_i = \sum_{i \in \mathcal{K}} \varphi_i(\bar{x}_i)w_i + \sum_{i \notin \mathcal{K}} \bar{x}_i w_i,$$

where $\phi_i(\cdot)$ denotes a modulation function applied to the i-th coefficient belonging to a set of secret carriers and where $\tilde{x}_i$ is a projected coefficient and where $w_i$ is a basis vector of a set of basis vectors $R^N$.

4. The method according to claim 1, wherein modulating the content x in said transform domain is done according to an additive modulation function of the form:

$$\phi_A(\tilde{x}_i) = \tilde{x}_i + \alpha \text{sign}(\tilde{x}_i),$$

for i of the set of secret keys K, where $\phi_A(\cdot)$ denotes the additive modulation function for active content fingerprinting, where $\tilde{x}_i$ is a projected coefficient, and where $\alpha > 0$ stands for a strength of the modulation.

5. The method according to claim 4, wherein modulating the content x in said transform domain is done according to a mapping of the form:

$$v = \sum_{i \in \mathcal{K}} (\bar{x}_i + \alpha \text{sign}(\bar{x}_i))w_i + \sum_{i \notin \mathcal{K}} \bar{x}_i w_i = x + \alpha \sum_{i \in \mathcal{K}} \text{sign}(\bar{x}_i)w_i = x + s_A,.$$

where $S_A$ denotes a modulation signal, and where $w_i$ is a basis vector of a set of basis vectors $R^N$.

6. The method according to claim 1, wherein modulating the content x in said transform domain is done according to a quantization-based modulation function of the form:

$$\phi_Q(\tilde{x}_i) = c \text{sign}(\tilde{x}_i) = \tilde{x}_i + c \text{sign}(\tilde{x}_i) - \tilde{x}_i = \tilde{x}_i + (c - |\tilde{x}_i|)\text{sign}(\tilde{x}_i)$$

where $\phi_Q(\cdot)$ denotes the quantization-based modulation function for quantization-based active content fingerprinting, where $\tilde{x}_i$ is a projected coefficient, and where c is a reconstruction level.

7. The method according to claim 6, wherein modulating the content x in said transform domain is done according to a mapping of the form:

$$v = \sum_{i \in \mathcal{K}} (\tilde{x}_i + (c - |\tilde{x}_i|)\text{sign}(\tilde{x}_i))w_i + \sum_{i \notin \mathcal{K}} \tilde{x}_i w_i = x + \sum_{i \in \mathcal{K}} (c - |\tilde{x}_i|)\text{sign}(\tilde{x}_i)w_i,$$

where $w_i$ is a basis vector of a set of basis vectors $R^N$.

8. The method according to claim 1, modulating the content x in said transform domain is done by using an advanced modulation strategy that modulates only low-magnitude coefficients of the vector components of content x in a space of secret carriers of said transform domain defined by the key k while preserving or modulating to a lesser extent large-magnitude coefficients.

9. The method according to claim 1, wherein modulating the content x in said transform domain is done by applying scalar or vector modulation.

10. The method according to claim 9, wherein modulating the content x in said transform domain is done by applying vector quantization modulation in combination with lattice quantization.

11. The method according to claim 10, wherein robust features of the content x, in particular SIFT features, are used for obtaining invariance to geometric transformations by extracting the robust features from the content x, quantizing positions of the robust features to centroids of an adequate lattice quantizer, and performing an adequate vector modulation of the content x in said transform domain to facilitate their detection in the defined positions.

12. The method according to claim 1, wherein modulating the content x in said transform domain is done in combination with application of an auto error-correction scheme, such that modulating the content x in said transform domain is done by use of a mapping of a general form $\psi:X^N \times K \rightarrow B^{L+J} \times V^N$ such as to produce a modulated vector v of a set of contents $X^{N+L}$ in the space of secret carriers of the transform domain defined by the key k, where L components of vector v are informative and J components of vector v are complementary, the J components being adapted to correct errors in the L components.

13. The method of claim 1, further comprising:
providing a non-transitory computer readable storage medium including a computer program product, the computer program product executable by a processor to implement steps (b), (d), (e), (f), (g), and (h) of the method.

14. The method according to claim 1, wherein content x is based on one or more of a group consisting of digital media, printed documents, and physical objects, and wherein the method further comprises:
identifying, for detection of local modification, or for other content related management including tracking, tracing and monitoring, the content x using said ID number stored in the database.

15. The method according to claim 1, wherein content x is based on a physical object, and wherein a specific modulation function $\psi$ is used which is adapted to perform a modulation of content x in the transform domain that takes into account given constraints on said physical object in the direct domain.

16. A system for generating content based fingerprints, the system comprising:
a processor; and
a non-transitory computer readable storage medium, the computer readable storage medium including computer program product executable by the processor to cause the system to:
assign an ID number to a content x of a set of contents $X^N$;
provide a secret key k of a set of secret keys K;
generate a fingerprint $b_x$, of a set of fingerprints $B^L$, based on content x and secret key k by use of a mapping function, the mapping function having the general form $\psi:X^N \times K \rightarrow B^L$;

modulate the content x in a space of secret carriers of a transform domain defined by the key k by use of a mapping function having the general form $\psi:X^N \times K \to B^L \times V^N$, $V^N$ being a set of modulated contents, such as to produce a modulated content vector v, said content v comprising content that is content x changed by the mapping function based on secret key k, and replacing content x in the set of contents $X^N$; and store the generated fingerprint $b_x$ together with the assigned ID in a database.

17. The system of claim 16, wherein the computer program product is executable by the processor to further cause the system to:

extract, for a given query content y which might result either from the enrolled content x or an unrelated content x' of the set of contents $X^N$, an estimate fingerprint $b_y$ based on the given query content y and secret key k, the estimate fingerprint $b_y$ extracted by use of a mapping function having the general form $g:Y^N \times K \to B^L$; $Y^N$ being a set of query contents, and produce an estimated ID number based on said estimate fingerprint by for identifying the content x using said ID number stored in the database, or else rejecting the query.

18. A computer program product stored in a non-transitory computer readable storage medium, the computer program product executable by a processor to implement a method of providing a robust and secure fingerprint, the method comprising:

(a) providing a content x of a set of contents $X^N$ for which a fingerprint is to be provided, (b) assigning an ID number to said content x, (c) providing a secret key k of a set of secret keys K, (d) generating, using the processor, a fingerprint $b_x$ of a set of fingerprints $B^L$ based on content x and secret key k by use of a mapping function, the mapping function of the general form $\psi:X^N \times K \to B^L$, (e) storing the generated fingerprint $b_x$ together with the assigned ID in a database, and, at an identification stage, the steps of (f) extracting, for a given query content y which might result either from the enrolled content x or an unrelated content x' of the set of contents $X^N$, an estimate fingerprint $b_y$ based on the given query content y, and secret key k by use of a mapping function of the general form $g:Y^N \times K \to B^L$, $Y^N$ being a set of query contents, (g) producing an estimated ID number based on said estimate fingerprint by for identifying the content x using said ID number stored in the database, or else rejecting the query, wherein generating the fingerprint $b_x$, comprises the step of (h) modulating using a processor, the content x in a space of secret carriers of a transform domain defined by the key k by use of a mapping of the general form $\psi:X^N \times K \to B^L \times V^N$, $V^N$ being a set of modulated contents, such as to produce a modulated content vector v, said content v comprising content that is content x changed by the mapping function based on secret key k, replacing content x in the set of contents $X^N$ and being adapted to be used during the identification stage in steps (f) and (g).

* * * * *